INVENTOR
Royal V. O'Reilly
BY Pierce, Scheffler & Parker
ATTORNEYS

INVENTOR
Royal V. O'Reilly
BY Pierce Schiffler & Parker
ATTORNEYS

June 5, 1962 R. V. O'REILLY 3,038,061

APPARATUS FOR TRANSLATING SOUND INTO CORRELATED PHYSICAL EFFECTS

Filed June 23, 1959 6 Sheets-Sheet 3

INVENTOR

Royal V. O'Reilly

BY Pierce, Scheffler & Parker

ATTORNEYS

INVENTOR
Royal V. O'Reilly
BY Pierce, Scheffler & Parker
ATTORNEYS

INVENTOR
Royal V. O'Reilly
BY Pierce, Scheffler & Parker
ATTORNEYS

INVENTOR
Royal V. O'Reilly
BY Pierce, Scheffler & Parker
ATTORNEYS

United States Patent Office 3,038,061
Patented June 5, 1962

3,038,061
APPARATUS FOR TRANSLATING SOUND INTO CORRELATED PHYSICAL EFFECTS

Royal V. O'Reilly, Douglas, Alaska, assignor to Colorsound Mfg. Co. Inc., Douglas, Alaska, a corporation of Alaska
Filed June 23, 1959, Ser. No. 822,384
5 Claims. (Cl. 240—3.1)

This invention relates to apparatus for translating sound into correlated physical effects such as for example motion or color wherein different effects as well as the magnitudes thereof are produced in accordance with the different frequency components present in the sound envelope and their respective amplitudes. The motion or color or other physical effects vary continuously and in synchronism with the corresponding variation in the frequency make-up of the sound and produce a very pleasing and entertaining effect to the human senses. Variation in visual effects such as the production of different colors of varying amplitudes where each color is associated with a different frequency or frequency band in the sound spectrum has a distinctive appeal and is especially suited to entertainment or theatrical purposes. Apparatus of this type is popularly known as a "color organ."

Various types of color organs have been developed in the past but have various disadvantages and it is the purpose of the present invention to provide an improved construction which overcomes many of these disadvantages, an apparatus which is relatively light in weight and which can be easily adapted to various embodiments.

Apparatus of the general type described includes filter components for dividing out the sound envelope into a plurality of frequency channels each of which leads to its respective physical effect to be controlled. In the case of a color organ, each such frequency channel is arranged to control a light which displays a distinctive color. It is an object of the present invention to provide an improved filter construction which is readily tunable to establish different pass characteristics, and does not require any iron core, thus reducing the overall weight of the apparatus. The improved filter is such that one piano note separation or better can be easily achieved thus permitting more than one hundred different colors or shades to be independently controlled. Moreover, the filter enables each separate frequency channel to be varied in width and adapt it to the total number of channels into which it is desired to divide the whole audio frequency range.

A further feature of the present invention resides in the arrangement of a voltage multiplier for converting the normally available 115 volt A.C. power supply into the required higher voltage for furnishing the plate supply for the various electronic tubes utilized in the apparatus without recourse to a conventional iron core transformer thus further decreasing the weight and enhancing portability. Another disadvantage of color organs of prior known constructions is that the color pattern does not follow the sound envelope in a particularly pleasing manner. A particularly annoying characteristic of prior constructions is that the fall-off in intensity of a color follows too closely the fall-off in amplitude of the audio frequency associated with that color thus giving rise to a flicker action. To eliminate this undesirable characteristic, the present invention provides a decay feature which allows the color to respond quickly to sharp crescendos and percussion attacks but causes the color to decay slower than the sound. Thus for the average musical program material, the colors appear to ride the top of the sound envelope but do not appear to move in a jerky fashion which could easily become annoying.

Another feature of the present invention is the limiting action produced to protect the lamp load against over-voltage in the event the signal strength of the sound rises to very high values. This limiting action is due to the fact that the lamp load is connected in the plate circuit of a tetrode and the current in such circuit is limited by grid current.

Still another feature of the present invention resides in application of the system to a lamp load of the electro-luminescent type. It has been found that the color activity and efficiency of electro-luminescent lamps or cells increases with extremely high audio frequencies—up to 20,000 cycles. To produce this enhanced effect with the ordinary sound envelope, the present invention includes a frequency multiplier in each frequency channel ahead of the final output.

Another feature of the invention is the provision of a complete color organ comprising a housing containing the necessary electronic equipment for producing a plurality of outputs each corresponding to a different audio frequency or band of frequencies, a microphone built into the housing by which the color organ may be excited by sound from any source without the necessity for connecting any wires to external apparatus, and a display device in the form of a tree mounted in an upstanding manner on the housing, the tree being provided with a plurality of lamp circuits connected to the different outputs, the lamps of each circuit being of the same color, and the lamps of different circuits having different colors.

The foregoing as well as other objects and advantages inherent in the invention will become more apparent from the following detailed description of several different embodiments thereof and from the accompanying drawings in which.

Figure 1:
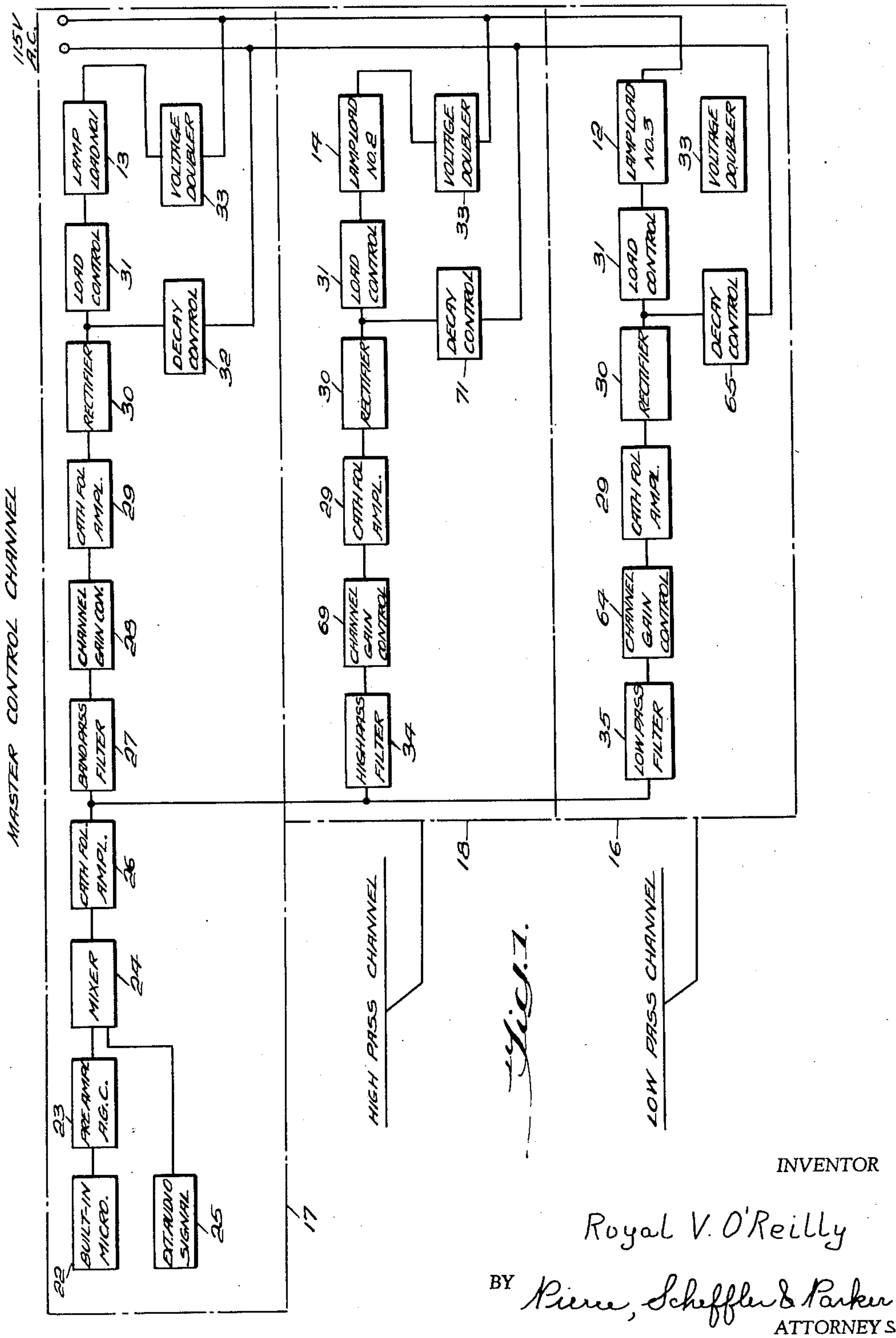
FIG. 1 is a block schematic circuit diagram of one embodiment of the invention as applied to the construction of a three channel color organ having a master control channel, a low pass channel and a high pass channel.

The embodiment of the invention as shown in FIGS. 1–6 is designed as a self-contained unit for use in conjunction with any source of sound, i.e. an audio input, in order to produce various color patterns in accordance with the varying frequency content of the audio input. The electronic apparatus for translating sound into color is contained within a housing 10 upon which is mounted a tree 11, e.g. one shaped as a Christmas tree, having a plurality of lamp circuits arranged on the same at different levels. In the embodiment shown in FIG. 6, the lower portion of the tree includes a lamp circuit containing a plurality of red lamps 12 connected in series; the middle part of the tree includes a second circuit containing a plurality of yellow lamps 13 connected in series; and the upper part of the tree includes a third circuit containing a plurality of series connected blue lamps 14. The connecting leads to these three lamp circuits arranged on the tree pass through the tree trunk 15 into the housing, the base of the tree being secured to the top wall of the housing by means of a screw type coupling or connector **15*a***.

In a particular arrangement found to be quite pleasing to the senses, low audio frequencies are used to generate low frequency colors, namely, reds; medium frequency audio signals are used to generate medium frequency colors, namely, yellows; and high audio frequencies are used to generate high frequency colors, namely, blues. By overlapping these three basic primary colors, as in the classic color wheel, all the infinite varieties of colors, shades and tints found in the color spectrum may thus be reproduced.

The electronic apparatus contained within housing 10 consists of three separate units 16, 17 and 18 each of which is assembled upon its own base plate for insertion as a unit into the housing. The center one 17 of these units will be referred to hereinafter as the "master control control channel," and the units 16, 18 to the left and right of the same will be hereinafter referred to as the "low pass channel" and "high pass channel" respectively. The power pack for the three channels can be arranged at the rear portion **10*a* of housing 10 and includes a receptacle 19 by which the apparatus is connected to an electrical supply source such as 115 volts A.C., a fuse 20 and an off-on switch 21**.

Figures 5, 6:
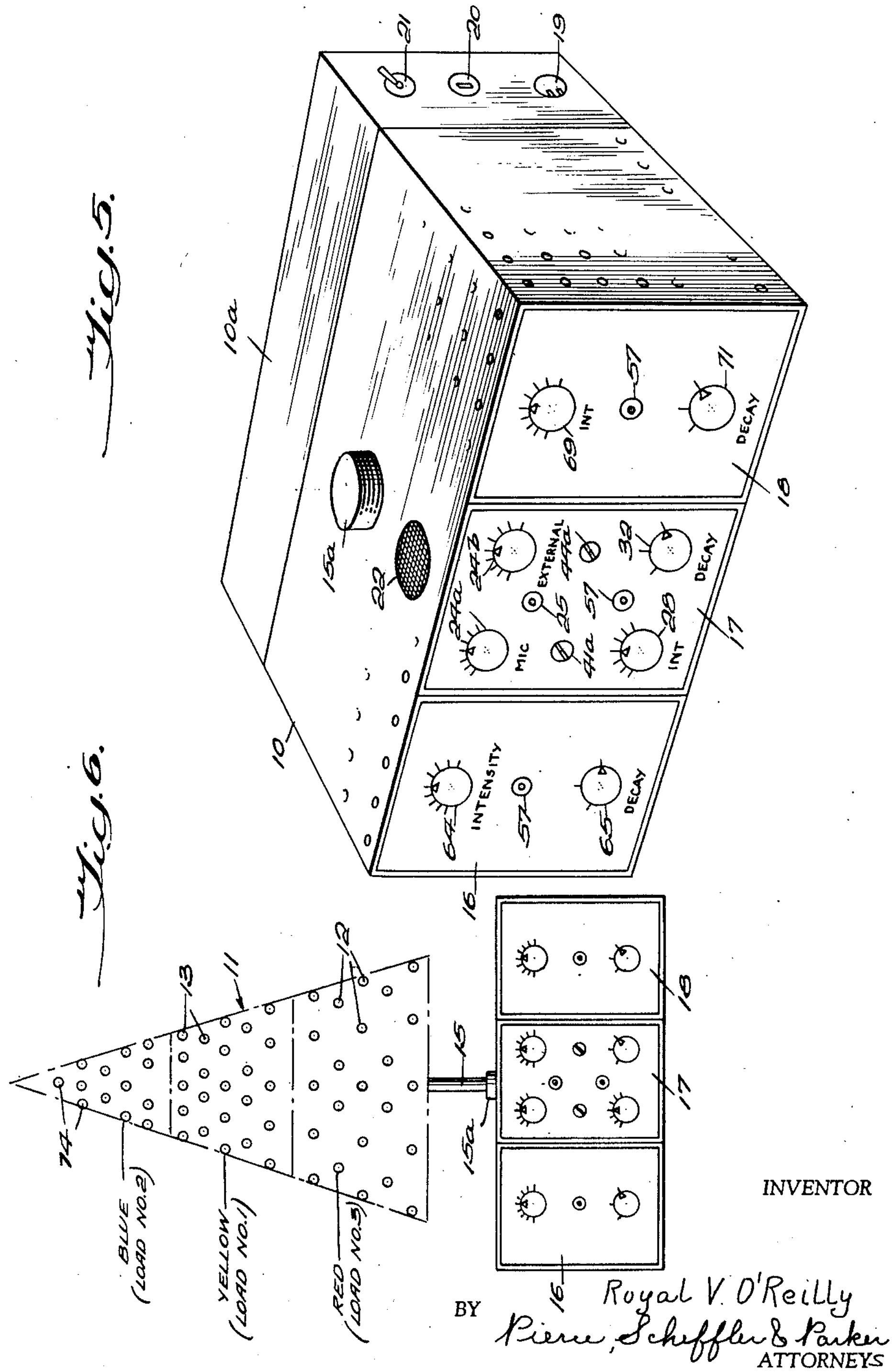
FIG. 5 is a view in perspective of the housing containing all three channels and the built-in microphone.
FIG. 6 is a view in front elevation drawn to a scale smaller than FIG. 5 and showing the three channel unit with the lamp-equipped tree mounted upon the same.

Block schematic circuit diagrams for these three channels are shown in FIG. 1. The "master control channel" 17 includes an accoustic input source such as microphone 22 which is built-in and, as shown in FIG. 5 is mounted into the top face of housing 10. Microphone 22 feeds into a pre-amplifier unit 23 with automatic gain control (a.g.c.) A mixer stage 24 follows the pre-amplifier 23 and functions to establish the desired input level for the remaining amplification stages.

As an alternative or as an addition to the low level input from microphone 22, the apparatus is provided with means 25 by which a high level external audio signal may be applied. Such an external audio signal may be the output from a high-fidelity phonograph or the audio output from a radio or a public address system or an electronic musical instrument and likewise feeds into the mixer 24.

The output from mixer 24 feeds into a cathode follower stage 26 of amplification which serves to reduce the impedance and thus better enable a plurality of different frequency channels to be supplied. The output from amplifier 26 is applied simultaneously to three separate channels, each of which is correlated to a specific portion of the frequency spectrum. The master control channel 17 is provided with a band pass filter 27 which is broadly tuned so as to pass only a middle range of audio frequencies e.g. in the range from 150–1500 cycles and is preferably peaked at 640 cycles. A channel gain control 28 receives the output from filter 27 and feeds a two-stage cathode follower output amplifier 29 which lowers the impedance. The output from amplifier 29 is supplied to an audio rectifier 30 of the voltage doubler type, and the output from rectifier 30 determines the intensity of illumination of the yellow lamps 13 (load No. 1) on the tree 11 and is effected by means of a load control unit 31 connected in series with lamp load No. 1, a decay control unit 32 and a voltage doubler unit 33, this series circuit being energized from a conventional power supply source such as 115 volts A.C. The lamps of all three load circuits are of the low voltage series type and the total lamp load of each circuit will amount to about 20 watts which is about the maximum that the electronic load control unit can handle. If a greater lamp load per circuit is desired, it may be necessary to interpose an amplifier such as one of the magnetic type so that the output from the load control unit does not control the lamps directly but rather the control bias of the interposed magnetic amplifier.

The purpose of the decay control unit 32—such a decay control is provided for each channel—is to delay the fall-off in lamp illumination after the peak has passed in order to give a more pleasing effect to the eye as the amplitude of the audio signal in the various channels varies in accordance with the variation in frequency makeup of the whole audio signal.

The output of the cathode follower 26 in the master control channel 17 is simultaneously applied to the high pass channel 18 and the low pass channel 16. A broadly sloping high pass filter 34 in the high pass channel is designed to pass all audio frequencies from 1,000 to 12,000 cycles and is preferably peaked at 10,000 cycles. A broadly sloping low pass filter 35 in the low pass channel 16 is designed to pass all audio frequencies in the range from 40 to 250 cycles and is preferably peaked at 50 cycles. This arrangement increases the color activity at the extreme ends of the audio spectrum.

The output from filter 34 in the high pass channel 18 feeds through the same sequence of components as the output of band pass filter 27 in the master control channel 17 so as to control lamp load No. 2 which is the blue lamp circuit at the upper part of the illuminated tree.

The output from filter 35 in the low pass channel 16 likewise feeds through the same sequence of components as the output of band pass filter 27 in the master control channel 17 so as to control lamp load No. 3 which is the red lamp circuit at the lower part of the illuminated tree.

In operation, the control of all three lamp load circuits can be set in such manner that all lamps on all circuits burn quite dimly under a no-signal condition. In this manner an increase in bass such as associated with bass instruments, men's voices, drums and organ pedals will cause an increase in intensity of the lamps 12 in the red lamp circuit.

Similarly, an increase in the middle range of frequencies such as associated with all vocals, low horns, woodwinds, strings and organ will cause an increase in intensity of the lamps 13 in the yellow lamp circuit. Likewise, an increase in the upper range of frequencies such as associated with women's voices, high horns, winds, strings and percussion instruments will cause an increase in intensity of the lamps 14 in the blue lamp circuit.

It will be noted from the above description of the frequency characteristics of the various channel filters that each channel frequency overlaps the frequency of an adjacent channel. This is preferably done to prevent "dead" spots or "holidays" between colors and to provide an adequate blend of colors which is necessary to produce sub-colors, shades and tints.

Figure 2:
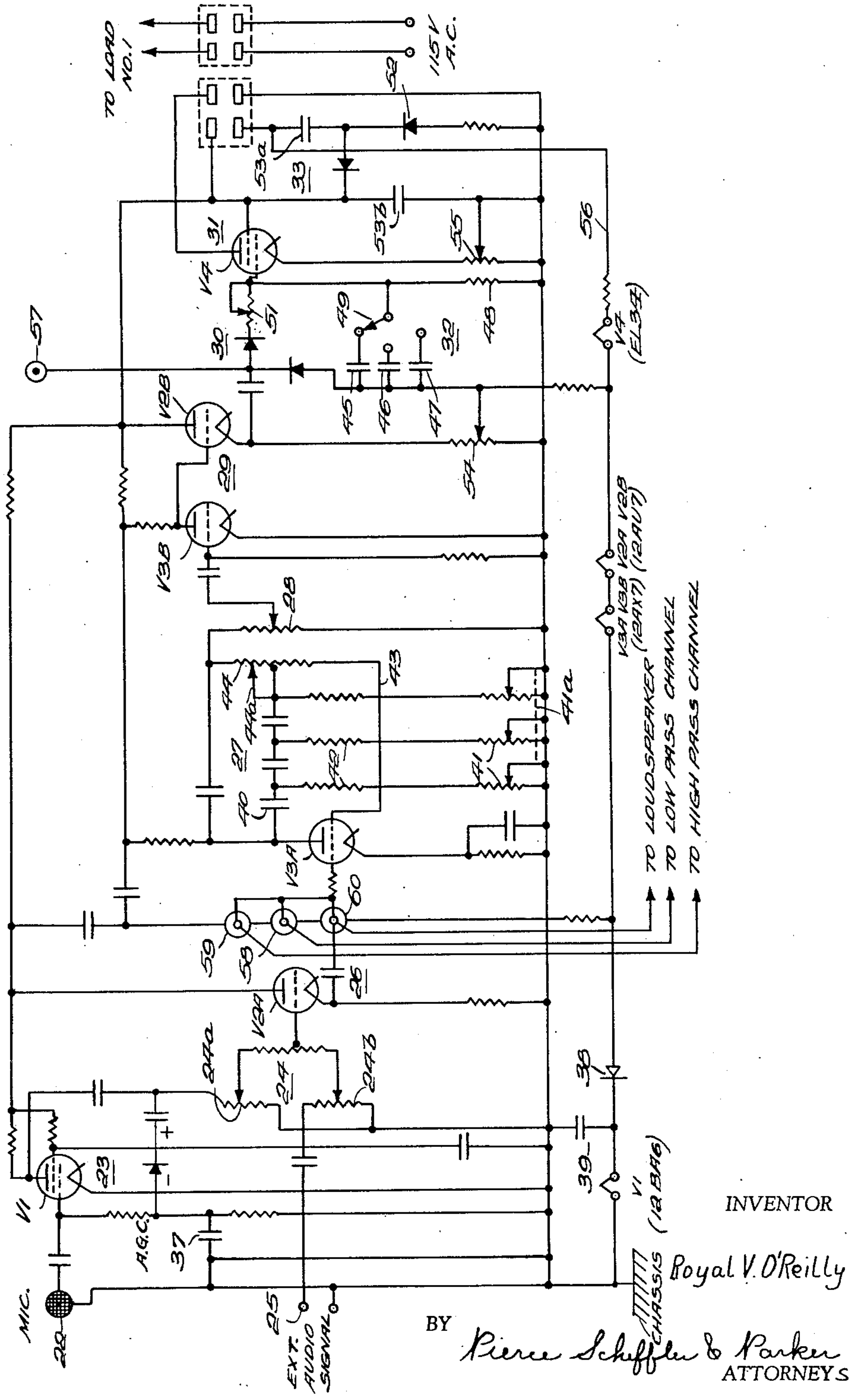
FIG. 2 is a more detailed circuit diagram of the master control channel.

Circuit details of the master control channel are shown in FIG. 2. There it will be seen that microphone 22 is connected into the input control grid of the pre-amplifier tube V1 which may be of the 12BA6 type and which functions as an automatic volume control limiting the gain for high intensity sounds picked up by the microphone at close range such as might be the case when the microphone is placed too near the speaker of a radio. Capacitor 37 is quite large, e.g. .1 or .25 mfd. so that the A.V.C. action will not follow the modulation but rather average volume changes. Hum is limited in this stage by using direct current on the heater for the tube V1 obtained from the heater circuit through rectifier 38 and smoothing capacitor 39. The output from tube V1 is applied to a potentiometer 24*a* of the mixer unit 24 and which is adjusted to the desired signal level.

The high level electrical input, connected to terminals 25 legended "External Audio Signal" is applied to a second potentiometer 24*b* of the mixer of adjustment to the desired amplitude level. As previously explained, the high level input channel may be fed from any low impedance or high impedance source such as the voice coil of a public address system, high fidelity phonograph, radio or electrical musical instrument or the grid or plate circuit of audio equipment when the signal level ranges from ½ to 10 volts. Thus the two inputs may be used together or separately and the signal level of each adjusted from zero upwardly in the potentiometers 24*a* and 24*b*.

The output from mixer 24 is amplified in one half V2A of a double triode which may be a 12AU7 connected as a cathode follower stage 26 in order to provide a low impedance output so that it can be directed into a plurality of separate channels for further amplification. One output from tube V2A is applied to a band pass filter unit 27 which comprises a three section lattice network connected to the plate circuit of one half V3A of a second double triode which may be a 12AX7. Each section of the filter lattice is constituted by a capacitor 40, and a variable resistance 41 connected in series with a fixed resistance 42 which causes a phase reversal between the plate and grid of control tube V3A, the output from tube V2A being connected to the grid of tube V3A. For all frequencies in the band to be passed by the filter, positive feedback is established over the feedback circuit 43 into the grid of tube V3A and the gain of tube V3A is thus increased. At all other frequencies outside of the band to be passed, the feedback is negative and causes a reduction in the gain of tube V3A. A variable resistance 44 which is in effect shunted across the entire lattice determines the "Q" of the circuit and therefore the sharpness of the filter, and thus the width of the band which it passes. An increase in the in-circuit value of the resistance 44 to increase the Q of the circuit will decrease the band width, and vice versa.

The variable resistances 41 which are ganged together at 41*a* for simultaneous adjustment enable the filter to be sharply tuned over a one-half octave range. This range is limited by the fixed resistors 42 in order that the high "Q" of the circuit may be realized. Actual octave range is determined by the capacitor 40. The three section lattice type of filter is chosen to afford sufficient Q without the possibility of causing oscillation.

The output from filter 27 is applied to potentiometer 28 which functions as the channel gain control previously mentioned. Potentiometer 28 is, in turn, connected to the input grid of the second half V3B of the double triode and the output from the plate of tube V3B is connected to the input grid of the second half V2B of the double triode. This latter tube is connected as the cathode follower 29 so as to furnish a low impedance output to a voltage doubling audio rectifier unit 30 which charges a selected condenser of the group 45, 46, 47 and which determines the length of the decay voltage which is applied to the grid of tube V4 which may be an EL34 and which discharges through resistor 48. Selection of the condenser in condenser group 45–47 is effected by means of switch 49.

A variable resistance 51 between the rectifier 30 and the capacitor group 45–47 determines the "attack" voltage applied to the grid of tube V4. With sharp attacks, the response of the lamps follows closely the change in frequency characteristic in the audio signal. A zero value of resistance 51 gives a sharp attack. As the in-circuit value of resistor 51 is increased, it increases the time required to charge the selected condenser in group 45–47 resulting in a corresponding lag in the response of the lamp load.

The purpose of the control over the attack and decay of the signal controlling lamp intensity is to render the lamp response more pleasant and entertaining to the person using the equipment. It has been established by experiment with many persons that a pleasant and comforting reaction does not take place when the brilliance of the color follows the dynamics of the music precisely. Instead, the resulting flickering of the lamps becomes annoying. A most pleasing effect has been found to exist when the attack angle of the signal is made somewhat sharp so as to cause an almost immediate increase in lamp intensity as the amplitude of the appertaining signal frequency increases but to delay the decay of the brilliance by means of the decay circuit described above. Consequently, the lamp intensity or color will respond to sharp crescendos and percussion attacks but will decay or dim out somewhat behind the decay in the sound frequency itself. Thus for the average musical program material, it has been observed that the colors seem to ride the top of the sound envelope but do not appear to move in a jerky fashion which would prove irritating.

Tube V4 which is the load control 31 previously referred to is connected as a tetrode with the lamp load (load No. 1) in series with the plate circuit of this tube and the plate supply voltage furnished by voltage doubler circuit 33 consisting of rectifier 52 and condensers 53*a*, 53*b* fed from a source of power such as the 115 volt A.C. line shown on the drawing. Thus as the D.C. signal on the input grid of tube V4 increases with an increase in the amplitude of that portion of the frequency spectrum of the sound passed by the filter unit 27 there will be a corresponding increase in the intensity of the yellow lamps in lamp load No. 1.

The purpose of using the voltage doubler 33 is to obtain the necessary plate supply voltage for tube V4 from a conventional source of alternating current without having to use a transformer. This arrangement also provides a desirable limiting action in that the main direct current voltage supply created by the voltage doubler unit 33 is such that even with an unlimited amount of D.C. signal applied to the control grid of tube V4, the voltage appearing across the load never exceeds 120 volts which is a safe operating condition. Also, in operation, the direct current supplied to the control grid of tube V4 by the cathode follower V2B and the voltage doubler rectifier 30 is linear in respect to the audio frequency envelope only for low and medium amplitude signals. At a critical grid voltage on tube V4, this grid begins to draw appreciable current. The cathode follower V2B is unable to supply this rapidly increasing current demand and hence abrupt limiting action appears at the output of tube V4. By reducing the value of variable resistance 54 connected between the cathode of tube V2B and the common return or "ground" of the circuit, this desirable limiting action can be extended to the control of lamps having a small wattage limit.

Use of the tetrode V4 with a screen grid connected to the full high voltage supply as shown in FIG. 2 rather than to the load is more sensitive than using a simple triode because it increases the transconductance of the tube and hence produces a much larger change in plate current for a given change in the voltage applied to the signal grid. The important result is that the lamp intensity follows more linearly the dynamics of the audio and this very high non-linear amplification factor is important to compensate for the opposite non-linearity of lamp intensity versus supply voltage. The linear relationship between lamp intensity and audio dynamics is enhanced by the fact that transfer of power from tube to lamp is inefficient when filament is cool (low-resistance) but increasingly efficient as filament becomes hot (high-resistance).

The screen grid voltage on tube V4 remains at full supply voltage from the voltage doubler 33 during all conditions of operation. With no excitation on the signal input grid of tube V4 this tube is biased to near complete cut-off by a variable resistance 55 connected from the cathode of tube V4 to ground. Resistance 55 can be set to allow just enough current to flow through the plate load to cause the yellow lamps 13 to burn very dimly. Then, as the signal increases, the intensity or brilliance of the yellow lamps 13 builds up proportionately. If no illumination for the lamps is desired for a condition of zero input signal, resistance 55 can be so adjusted as to increase the bias on tube V4 to complete cut-off.

The filaments of the double triodes V2A-V2B and V3A-V3B, and tetrode V4 are series connected to the 115 volt alternating current supply mains via circuit 56 as shown in FIG. 2.

It will be noted from the circuit of FIG. 2 that a jack 57 is provided at the output of cathode follower tube V2B in order to enable the channel frequency to be tested and calibrated by means of a vacuum tube voltmeter.

It will be noted that internal jacks 58, 59, 60 are provided at the unfiltered output of cathode follower V2A which immediately precedes the band pass filter unit 27. Two of these jacks 58, 59 provide connection from the output of cathode follower V2A to the low and high pass channels 16, 18 respectively, and the third jack 60 provides a connection to a loudspeaker, not shown, if such is desired for any particular reason.

Figures 3, 4, 8:
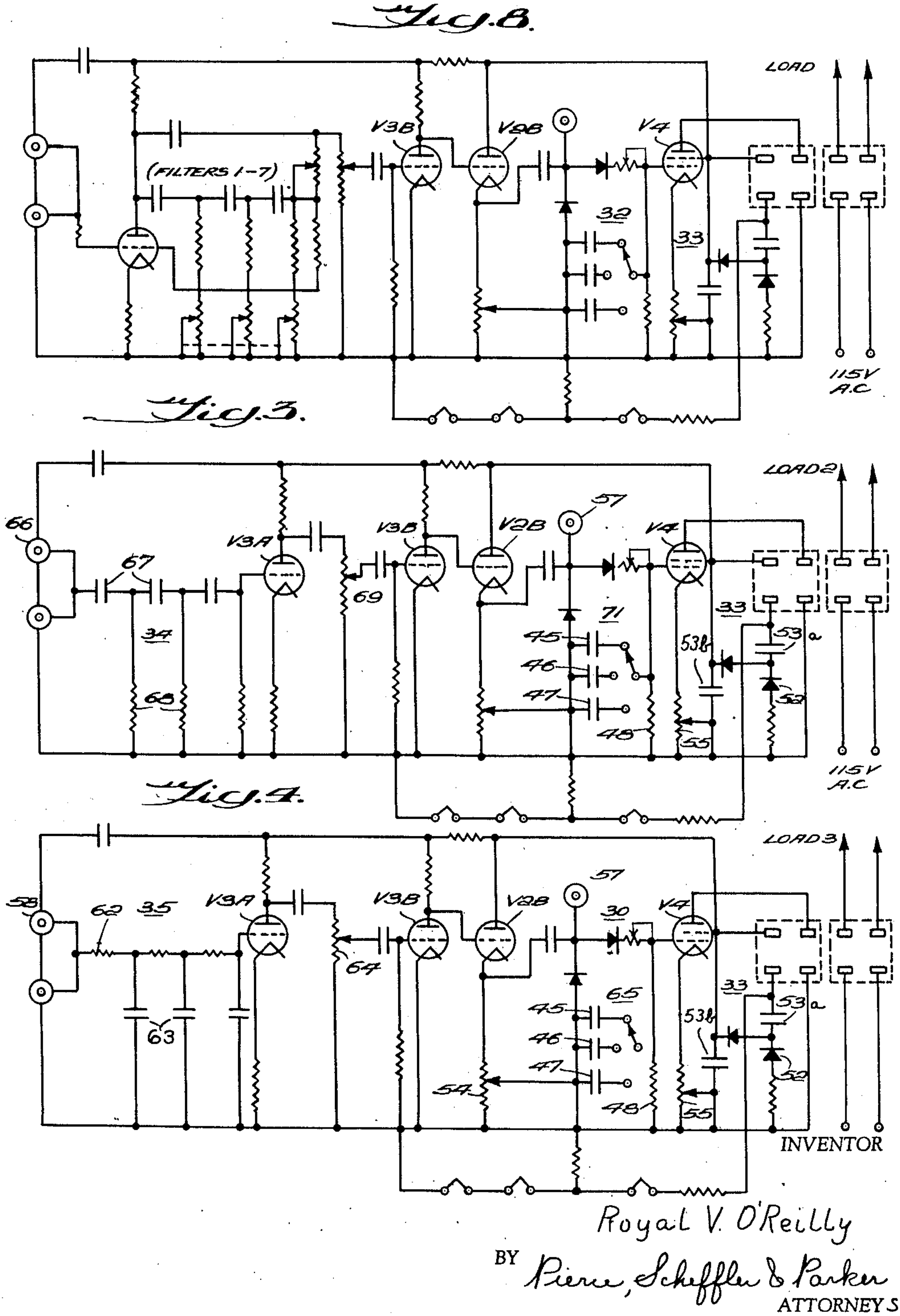
FIG. 3 is a more detailed circuit diagram of the high pass channel.
FIG. 4 is a more detailed circuit diagram of the low pass channel.
FIG. 8 is a detailed circuit diagram of one of the band pass channels shown in FIG. 7.

Circuit details of the low pass channel 16 are shown in FIG. 4. There it will be seen that the output from cathode follower stage 26 (tube V2A) is connected via jack 58 to low pass filter unit 35 previously mentioned consisting of a three section lattice, each section of which includes a series connected resistor 62 shunted by a capacitor 63. In the particular embodiment being described, it will be remembered that filter 35 will pass all signal frequencies from 250 cycles down to 40 cycles and is preferably peaked at 50 cycles. The output of low pass filter 35 is supplied to potentiometer 64 which constitutes the gain control for this channel, and from potentiometer 64 the low pass signal frequencies of the audio envelope are passed through an arrangement of components such as has been described above in connection with the circuit details for the master control channel including a decay control 65 and the final output fed to lamp load No. 3 which are the red lamps located at the lower portion of the three shown in FIG. 6. Such components have accordingly been given the same reference numerals for identification.

Circuit details of the high pass channel 18 are shown in FIG. 3. There it will be seen that the output from cathode follower stage 26 in the master control channel 17 is connected via internal jack 66 to high pass filter unit 34 consisting of a three section lattice, each section of which includes a series connected capacitor 67 shunted by a resistor 68. In the particular embodiment being described, it will be remembered that this filter will pass all signal frequencies from 12,000 down to 1,000 cycles and is peaked at 10,000 cycles. The output from the high pass filter 34 is supplied to potentiometer 69 which constitutes the gain control for this channel, and from potentiometer 69 the high pass signal frequencies of the audio envelope are passed through an arrangement of components such as has been above described with respect to the master control channel including a decay control 71 and the final output fed to lamp load No. 2 which are the blue lamps located at the upper portion of the tree. Such components have also been assigned the same reference numerals as used for channel 17.

Preferably as shown in FIG. 6 the gain control 28 and the decay control 32 for the master channel and for the high and low pass channels are brought out to the front panels for individual adjustment as may be desired. Also brought out to the panel front are the test jacks 57 by which the frequency of each channel may be checked and calibrated, the gang adjustment 41*a* for the variable resistor organization 41 in the master control channel by which the band pass filter unit 27 may be tuned, and the adjustment 44*a* for the variable resistance 44 by which the "Q" of the filter, and hence the width of the band pass may be adjusted.

It is desired to point out that the embodiment of FIGS. 1–6 is not limited to division of the audio envelope into three color generators each having a different frequency response characteristic. The construction of the filter unit 27 which has been described in conjunction with the master control channel is such that one piano note separation, or better, can be easily achieved thus permitting over one hundred different colors or shades to be independently controlled.

Figure 7:
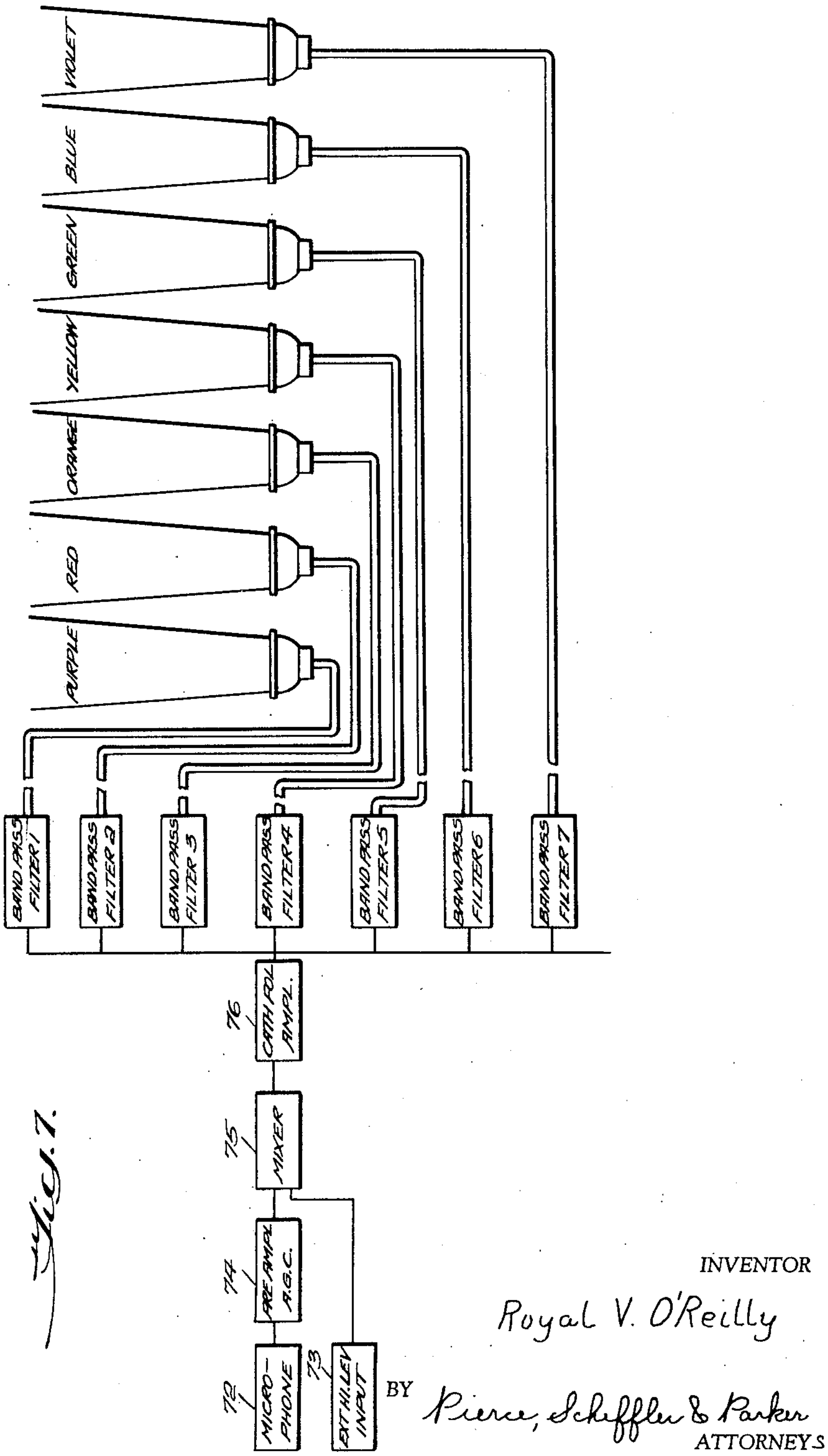
FIG. 7 is a block schematic circuit diagram of another embodiment of the invention which features seven different frequency channels, each of which corresponds to a different band pass in the audio envelope.

Another embodiment of the invention is illustrated in block schematic form in FIG. 7. This embodiment is particularly well suited for the illumination of stage plays, colored motion pictures and television, ballets, popular and symphonic orchestras and the like. In this embodiment, the sound frequency spectrum is divided up into seven channels and the frequency range passed by each channel is determined by a band pass filter of the type shown in circuit detail in FIG. 8 which is similar to the band pass filter unit previously described. The sound input to be displayed visually can be received accoustically by microphone 72 or electrically at the high level input 73. If by microphone, the input is first amplified in the pre-amplifier unit 74 and then supplied to mixer unit 75. The external high level input, if used, is supplied directly to mixer 75. The output from mixer 75 feeds into a cathode follower amplifier stage 76 and the arrangement and circuit details of these components are the same as has been described for the master control channel 17 of the previous embodiment. The low impedance output from cathode follower 76 is supplied simultaneously to all seven of the band pass filter channels, i.e. filter units 1–7. The output from each filter is then passed through the same arrangement of components as has been described for the master control channel and fed to its respective lamp. As shown in FIG. 7, the seven lamp loads, namely, purple, red, orange, yellow, green, blue and violet obtained by means of appropriate color filters are arranged in that sequence and in a row such as across the front of a stage so as to simulate a solar spectrum. The seven band pass filter units 1–7 divide up the frequency of the sound spectrum into seven sections. Filter No. 1 passes the lowest portion of the frequency spectrum and supplies the purple lamp load. Filter No. 7 passes the highest portion of the frequency spectrum and supplies the violet lamp load. Filters Nos. 2–6 therebetween are graduated to pass bands of increasing frequency and are connected respectively to the red, orange, yellow, green and blue lamp loads. Thus as the frequency make-up of the sound varies so also will the intensity of the corresponding lamps allocated to the various frequency bands thus presenting a most pleasing effect to the viewer.

Figure 9:
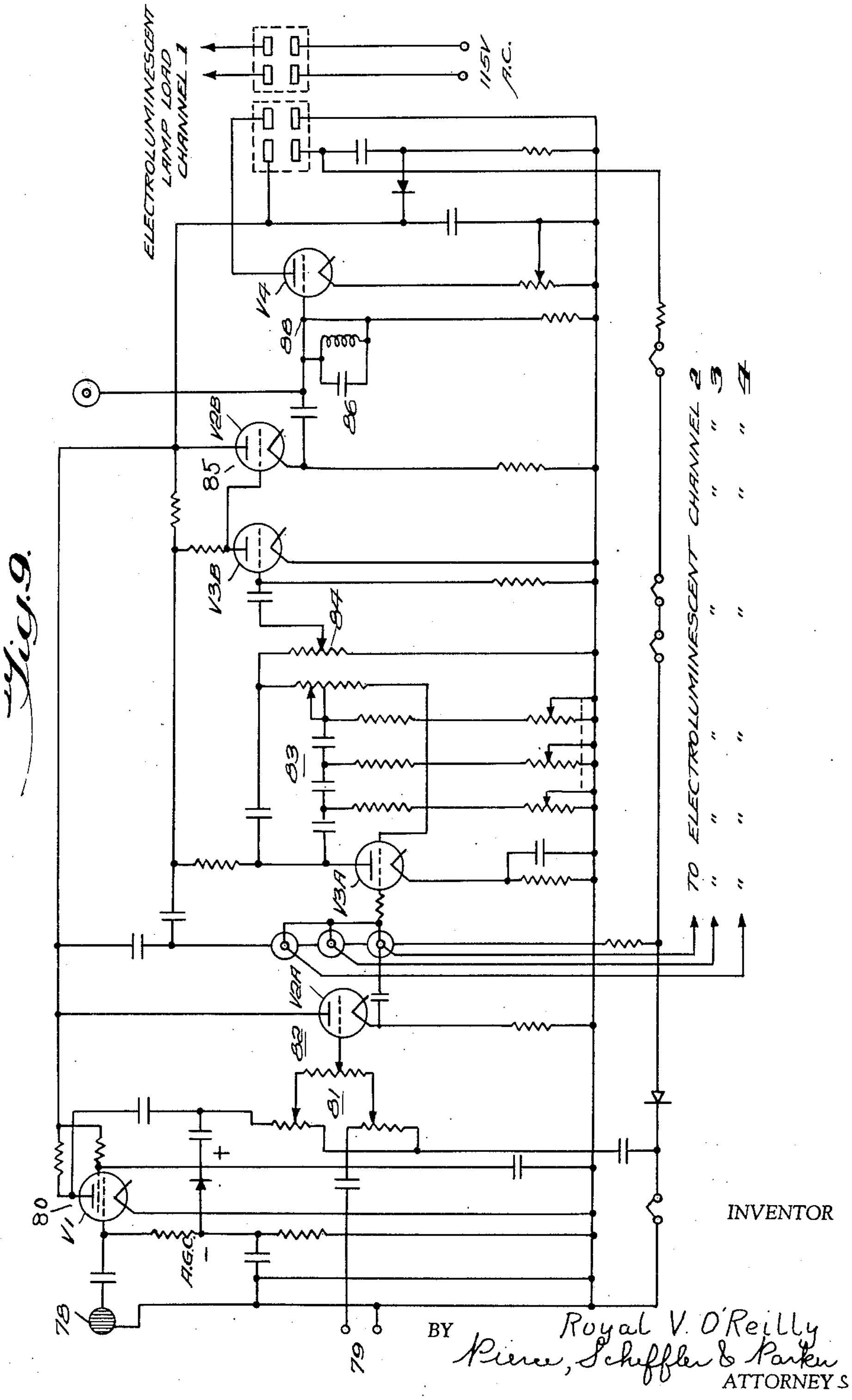
FIG. 9 is a detailed circuit diagram of another embodiment of the invention as applied to the controlled illumination of a plurality of electro-luminescent lamps, this view showing a common or master input circuit for the sound and one of the output channels.

Still another embodiment of the invention is illustrated in FIG. 9. In all of the previously described embodiments the lamp load is assumed to be of the conventional incandescent type. Interesting and beautiful effects can be obtained by driving lamps of the electro-luminescent type with frequency components of the audio envelope. Typical constructions for these lamps can be found in many different patents among which is U.S. Letters Patent No. 2,810,883. A principal characteristic of these lamps or cells is that the color emitted by the same is a function of the frequency of the applied alternating current as well as the voltage. As the electro-luminescent lamps are physically flat and plate like and the emitted color is a surface glow in contrast to the light given off by the conventional filament of an incandescent lamp, particularly attractive wall displays or back drop effects may be created.

In FIG. 9, it will be seen that this embodiment comprises a master control channel similar to the master control channel previously described which includes microphone 78 and external audio signal input 79, preamplifier unit 80, mixer 81 and cathode follower amplifier stage 82. The output from cathode follower 82 is fed into a band pass filter unit 83 which is tuned to the frequency band to be passed, and the output from filter unit 83 is supplied to channel gain control potentiometer 84. From potentiometer 84 the signal is fed to cathode follower stage 85. In the previously described embodiments, the output from cathode follower V2B was rectified and its voltage doubled prior to driving the control grid of the tetrode V4. In this embodiment, alternating current is used to drive the control grid of the tetrode V4. Consequently, signal rectification is omitted. It has been noted that the color activity and efficiency of electro-luminescent cells increase with extremely high audio frequencies—up to 20,000 cycles. To obtain this effect, the circuit of FIG. 9 thus includes a full wave frequency doubler unit 86 of the standard inductance-capacity type. The doubled frequency obtained at circuit point 88 is then applied to the control grid of tube V4 and the output from the latter is used to feed the electro-luminescent lamp load of channel 1. The color emitted from the electro-luminescent lamp load in channel 1 will be determined by its frequency as well as by the voltage applied thereto. However, it is to be noted that the colors produced by electro-luminescence invert the solar spectrum-normal sound relationship. Consequently, high frequency components of the audio envelope will establish a red color effect while low frequency components will establish a blue color effect.

FIG. 9 shows, as an example, three other channels i.e. channels 2, 3 and 4, taken off the output of cathode follower V2A. Each of these channels feeds into a band pass filter similar to filter unit 83 which is tuned to the desired band of frequencies to be passed, and the respective outputs from these band pass filters are further processed in components the same as those shown in FIG. 9 being finally fed to their respective electro-luminescent lamp loads. The several electro-luminescent lamps may be arranged in a line similar to the arrangement shown in the embodiment of FIG. 7 or in any other desired arrangement. The decay control as described in relation to the embodiment shown in FIGS. 1–6 is not necessary when electro-luminescent lamps are used since these lamps exhibit an inherent decay in the color given off as the voltage is removed therefrom.

In conclusion it is desired to point out that the foregoing embodiments of the invention which have been described are to be considered as typical rather than limitative of the various constructions possible and hence may be departed from in details without, however, departing from the spirit and scope of the invention as defined in the appended claims.

I claim:

1. Apparatus for translating sound into correlated physical effects comprising an input circuit for the sound, a plurality of frequency channel units connected to said input circuit, each said unit including a filter for accepting and passing through a different portion of the frequency content of the sound, an output amplifier connected in each of said units, rectifier means connected to the output of each said amplifier, a load control tube for each of said units, an electrical load connected in the plate circuit of each of said load control tubes, each said rectifier means being connected to the control grid of the load control tube associated therewith for effecting a variation in its grid potential and hence in its plate current and hence also a corresponding variation in the amplitude of the physical effect produced by the correlated electrical load, and a decay control in each of said units for effecting a delay in fall off of the amplitude of the physical effect produced by the corresponding electrical load as the amplitude of the audio frequency content appertaining to such unit falls off, each said decay control comprising condenser means connected to the output side of the correlated rectifier means for charging therefrom and a discharge path from said condenser means.

2. Apparatus as defined in claim 1 wherein said condenser means are variable to thereby vary the amount of the decay.

3. Apparatus for translating sound into correlated physical effects comprising an input circuit for the sound, a plurality of frequency channel units connected to said input circuit, each said unit including a filter for accepting and passing through a different portion of the frequency content of the sound, an output amplifier connected in each of said units, rectifier means connected to the output of each said amplifier, a load control tube for each of said units, an electrical load connected in the plate circuit of each of said load control tubes, each said rectifier means being connected to the control grid of the load control tube associated therewith for effecting a variation in its grid potential and hence in its plate current and hence also a corresponding variation in the amplitude of the physical effect produced by the correlated electrical load, a variable resistance interposed in the connections between each rectifier means and the control grid of the correlated load control tube for varying the attack of the voltage applied to the control grid, and a decay control in each of said units for effecting a delay in fall off of the amplitude of the physical effect produced by the corresponding electrical load as the amplitude of the audio frequency content appertaining to such unit falls off, each said decay control comprising condenser means connected at the output side of the correlated rectifier means for charging therefrom and a discharge path from said condenser means.

4. Apparatus as defined in claim 3 wherein said condenser means are variable thereby to vary the amount of the decay.

5. Apparatus for translating sound into correlated physical effects comprising an input circuit for the sound, a plurality of frequency channel units connected to said input circuit, each said unit including a filter for accepting and passing through a different portion of the frequency content of the sound, each said filter comprising a control tube having its input grid connected to said input circuit, a multiple section capacitance-resistance type lattice network connected in the plate circuit of said control tube, and a feedback circuit from the output side of said lattice network to the grid of said control tube, said lattice network producing positive feedback to increase tube gain at the critical frequency desired to be passed through said filter and negative feedback decreasing gain at all other frequencies, an output amplifier connected to the output side of each of said filters, rectifier means connected to the output of each said amplifier, a load control tube for each of said frequency channel units, an electrical load connected in the plate circuit of each of said load control tubes, each said rectifier means being connected to the control grid of the load control tube associated therewith for effecting a variation in its grid potential and hence in its plate current and hence also a corresponding variation in the amplitude of the physical effect produced by the correlated electrical load, a variable resistance interposed in the connections between each rectifier means and the control grid of the correlated load control tube for varying the attack of the voltage applied to the control grid, and a variable decay control in each of said frequency channel units for effecting a delay in fall off of the amplitude of the physical effect produced by the corresponding electrical load as the amplitude of the audio frequency content appertaining to such unit falls off, each said decay control comprising a variable condenser means connected at the output side of the correlated rectifier means for charging therefrom and a discharge path from said condenser means.

References Cited in the file of this patent

UNITED STATES PATENTS

| | | |
|---|---|---|
| 1,654,068 | Blattna | Dec. 27, 1927 |
| 1,690,279 | Craft | Nov. 6, 1928 |
| 1,977,997 | Patterson | Oct. 23, 1934 |
| 2,189,849 | Wheeler | Feb. 13, 1940 |
| 2,777,020 | Dobosy | Jan. 8, 1957 |

FOREIGN PATENTS

| | | |
|---|---|---|
| 428,399 | Great Britain | May 13, 1935 |